(12) United States Patent
Ho

(10) Patent No.: US 7,519,671 B2
(45) Date of Patent: Apr. 14, 2009

(54) METHOD FOR RECEIVING AND CLASSIFYING NORMAL E-MAIL AND ADVERTISING E-MAIL

(76) Inventor: Bo Tai Ho, 5F, No. 8, Min-Tsu 3rd Street, Shijr City, Taipei County (TW) 22155

( * ) Notice: Subject to any disclaimer, the term of this patent is extended or adjusted under 35 U.S.C. 154(b) by 789 days.

(21) Appl. No.: 11/084,148

(22) Filed: Mar. 21, 2005

(65) Prior Publication Data

US 2006/0123091 A1 Jun. 8, 2006

(30) Foreign Application Priority Data

Dec. 8, 2004 (TW) .............................. 93137863 A

(51) Int. Cl.
*G06F 15/16* (2006.01)
(52) U.S. Cl. ...................................... 709/206; 709/207
(58) Field of Classification Search ................. 709/206, 709/207
See application file for complete search history.

(56) References Cited

U.S. PATENT DOCUMENTS 6,868,498 B1 * 3/2005 Katsikas ...................... 726/14
7,392,249 B1 * 6/2008 Harris et al. .................... 707/5
2006/0031328 A1 * 2/2006 Malik .......................... 709/206

* cited by examiner

*Primary Examiner*—Salad Abdullahi
*Assistant Examiner*—Madhu Khanna
(74) *Attorney, Agent, or Firm*—Bacon & Thomas, PLLC

(57) ABSTRACT

A method for receiving and classifying normal e-mail and advertising e-mail is designed to establish a harmony relationship between the advertising-mail sender and the e-mail user, the method comprises: setting up a "normal inbox" and a "advertising inbox" in a mail-receiving-and-sending software for receiving the normal e-mail and the advertising e-mail respectively; making a design to make the "normal inbox" only accept e-mails with addresses which are listed on a list of permissible addresses beforehand by the user, and make "advertising inbox" only accept e-mails which are solicited by the user beforehand. Advertising-mail sender should classify the advertising e-mail thereof according to a "classification list", and attach identifying information to the advertising e-mail to be sent for enabling the public mail server to distinguish, an advertising e-mail without such identifying information is regarded as normal mail.

3 Claims, 3 Drawing Sheets

Outlook Express local folders

<u>normal inbox</u>

<u>advertising inbox</u> outbox sent items deleted items drafts

Outlook Express
   local folders
      inbox
      outbox
      sent items
      deleted items
      drafts

Fig. 1 (prior art)

Outlook Express
   local folders
      <u>normal inbox</u>
      <u>advertising inbox</u>
      outbox
      sent items
      deleted items
      drafts

Fig. 2 open (O)
finder (I)...
new folders (N)...
rename (M)...
delete (D)
add to Outlook bar (K)
properties (R)

Fig. 3 (prior art)

open (O)
finder (I)...
new folders (N)...
rename (M)...
delete (D)
add to Outlook bar (K)
properties (R)
permissible address

Fig. 4

☐ electronic industry
☐ computer industry
☐ law
☐ patent and trademark
☐ agriculture
☐ food industry

METHOD FOR RECEIVING AND CLASSIFYING NORMAL E-MAIL AND ADVERTISING E-MAIL

FIELD OF THE INVENTION

The present invention relates to an improvement of the e-mail in computer and Internet field, and more particularly to a method for receiving and classifying normal e-mail and advertising e-mail.

BACKGROUND OF THE INVENTION

Electronic mail (e-mail) has been commonly used as a useful advertising tool for many people or companies to post advertising message in bulk to different users in different countries and regions, consequently, a computer user will probably be harassed by hundreds of advertising e-mails (which is also called junk mail) every day.

Many efforts have been made in many countries and regions to develop a method of technologically blocking junk mail, or make a law on prevention of abuse of junk mail.

Facing the new junk-mail blocking technology and the new law on prevention of abuse of junk mail, the advertising-mail senders also fear that their survival will be affected if the advertising e-mail can not be mailed anymore.

The present invention has arisen to mitigate and/or obviate the afore-described disadvantages.

SUMMARY OF THE INVENTION

The primary objective of the present invention is to provide a method for receiving and classifying normal e-mail and advertising e-mail and for preventing unsolicited junk mail, comprising:

(a) classifying e-mails into normal e-mail and advertising e-mail;

(b) setting up a "normal inbox" and an "advertising inbox" in a mail-receiving-and-sending software for receiving the normal e-mail and the advertising e-mail respectively;

(c) making a design to make the "normal inbox" only accept e-mail with addresses which are listed on a list of permissible addresses beforehand by a user, and make "advertising inbox" only accept e-mails which are solicited by the user beforehand;

(d) clicking the right mouse button on the "normal inbox", an item of "permissible addresses" appears, and clicking the right mouse button on the "permissible addresses", a frame appears on which the user can make a list of permissible addresses, only the e-mails with the addresses included on the list of the permissible addresses will be received, when the user receives e-mail through the internet, the content of the "permissible addresses" will be automatically uploaded to and stored in a public mail server, the public mail server having a function of sending the e-mails with the permissible addresses to the "normal inbox" for the user, and other e-mails will not be sent to the "normal inbox";

(e) clicking the right mouse button on the "advertising inbox", a classification list including different business items appears for the user to choose, the user can tick a box before an interested business item to indicate that the advertising e-mail belonging to the selected business item is acceptable, and the advertising e-mails belonging to unselected business items will be blocked, when the user receives e-mail through the internet, the content of the "classification list" will be automatically uploaded to and stored in the public mail server, the public mail server having a function of sending the advertising e-mail belonging to the selected business item to the "advertising inbox" for the user, and other advertising emails belonging to the unselected business items will not be sent to the "advertising inbox";

(f) asking advertising-mail sender to classify the advertising e-mail thereof according to the above-mentioned "classification list", and attach identifying information to the advertising e-mail to be sent, so as to enable the public mail server to distinguish, an advertising e-mail without such identifying information is regarded as normal e-mail;

(g) if the user fails to make a list of "permissible addresses", the public mail server will accept all e-mails that are arrived in user's mail box, and will reject all advertising mails if the user fails to select an item on the "classification list";

(h) the public mail server can block unsolicited mail by taking use of the "permissible addresses" and the "classification list" previously defined and uploaded by the user, when the user is not online;

(i) the functions of (d), (e), (g) of the public mail server is set up in the mail-receiving-and-sending software, so that the e-mails will be received, classified and blocked by user's personal computer.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 1 shows a list of folders on the left frame of OUTLOOK EXPRESS® of MICROSOFT WINDOWS™;

FIG. 2 shows an "advertising inbox" is added to local folders of OUTLOOK EXPRESS® of MICROSOFT WINDOWS™ according to the present invention;

FIG. 3 shows a folder list appeared by clicking the right mouse button on the "inbox" of the OUTLOOK EXPRESS®;

FIG. 4 shows a new item of "permissible addresses" appeared by clicking the right mouse button on the "normal inbox" according to the present invention;

FIG. 5 shows a "classification list" appeared by clicking the right mouse button on the "advertising inbox" according to the present invention.

DETAILED DESCRIPTION OF THE PREFERRED EMBODIMENTS

Referring to FIG. 1, which shows a list of folders on the left frame of OUTLOOK EXPRESS® of MICROSOFT WINDOWS™, wherein the local folders include inbox, outbox, sent items, deleted items and drafts. According to the present invention, an "advertising inbox" is added to local folders, and the inbox in the original local folders is renamed to "normal inbox", as shown in FIG. 2, so as to classify the e-mails by receiving normal e-mail into "normal inbox" and putting advertising e-mail into "advertising inbox".

The "normal inbox" only accepts e-mails with the sender addresses that are listed by the user beforehand in a local whitelist of permissible addresses, and the "advertising inbox" only accepts advertising e-mails that are permitted by the user.

A folder list as shown in FIG. 3 will appear by clicking the right mouse button on the "inbox" of the original OUTLOOK EXPRESS®. In this invention, a new item "permissible addresses" is added to the folder list of FIG. 3, as shown in FIG. 4. By clicking the right mouse button on the "permissible addresses", a frame will appear on which the user can list the wanted e-mail addresses, only the e-mails with the addresses on the list of the permissible addresses are accepted. When receiving e-mail through the internet, the content of the "permissible addresses" will be automatically uploaded to and stored in a mail server, for example to the "mail server" of Chunghwa Telecom, so that Chunghwa Telecom company can send the e-mails with the permissible addresses to the "normal inbox" for the user, and other e-mail will not be sent to the "normal inbox".

In accordance with the present invention, a "classification list" as shown in FIG. 5 will appear by clicking the right mouse button on the "advertising inbox", for example, the classification list includes 1000 business items for the user to choose. The user can tick the box before the interested business items to indicate that the advertising e-mails belonging to the selected business items are acceptable, and the advertising e-mails belonging to the unselected business items will be blocked. When receiving e-mail through the internet, the content of the "classification list" will be automatically uploaded to and stored in a mail server, for example to the "mail server" of Chunghwa Telecom, so that Chunghwa Telecom company will send the advertising e-mails belonging to the selected business items to the "advertising inbox" for the user, and other advertising e-mails belonging to the unselected business items will not be sent to the "advertising inbox".

To classify the normal e-mail and the advertising e-mail, the advertising-mail sender is required to classify the advertising e-mail according to the above-mentioned "classification list", and attach identifying information to the advertising e-mail to be sent, so as to enable the mail server of the Chunghwa Telecom company to distinguish advertising e-mail. Any e-mail without such identifying information is regarded as normal e-mail. Chunghwa Telecom will first send the normal e-mails with the permissible addresses to the "normal inbox", and other normal e-mails will not be sent to the "normal inbox", and then Chunghwa Telecom will send the advertising e-mails belonging to the selected business items to the "advertising inbox", and other advertising e-mails belonging to the unselected business items will not be sent to the "advertising inbox". After sending the normal mail and the advertising mails to the user's computer, Chunghwa Telecom will delete all e-mails of the user in the mail server.

Alternatively, before the user is not online, Chunghwa Telecom also can block the unsolicited e-mail by taking use of the "permissible addresses" and the "classification list" previously defined and uploaded by the user. If the user didn't make a list of "permissible addresses", Chunghwa Telecom will accept all the e-mails that are arrived in the user's e-mail box. If the user didn't select any business items on the "classification list", the mail server of the Chunghwa Telecom will reject all the advertising e-mails.

The above-mentioned functions of the Chunghwa Telecom's mail server for classifying and deleting e-mail also can be set up in OUTLOOK EXPRESS® of MICROSOFT WINDOWS™, so that the e-mails also can be received, classified and blocked by the user's personal computer even if Chunghwa Telecom's mail server doesn't have such an e-mail classifying and deleting function.

If there are too many advertising e-mails during a certain period of time, adversely affecting the normal e-mail reception, the mail server of Chunghwa Telecom will stop receiving the advertising e-mails. Therefore, it is better for the advertising-mail sender to send the advertising e-mail at night.

By using the method of the present invention, the user will not worry about excessive junk mails anymore, the government doesn't need to enact related laws on prevention of abuse of junk mail, and the advertising-mail sender also can use e-mail as a marketing tool.

While we have shown and described various embodiments in accordance with the present invention, it should be clear to those skilled in the art that further embodiments may be made without departing from the scope of the present invention.

What is claimed is:

1. A method for receiving and classifying normal e-mail and advertising e-mail, comprising the steps of:
   (a) classifying e-mails into normal e-mail and advertising e-mail;
   (b) setting up a "normal inbox" and an "advertising inbox" in a mail-receiving-and-sending software for receiving the normal e-mail and the advertising e-mail respectively;
   (c) causing the "normal inbox" to only accept e-mail with addresses which are listed on a list of permissible addresses beforehand by a user, and causing the "advertising inbox" to only accept e-mails which are solicited by the user beforehand;
   (d) upon clicking a right mouse button on the "normal inbox", causing an item of "permissible addresses" to appear, and upon clicking the right mouse button on the "permissible addresses", further causing a frame on which the user can make a list of permissible addresses to appear, wherein only the e-mails with the addresses included on the list of the permissible addresses will be received, and when the user receives e-mail through the internet, the content of the "permissible addresses" will be automatically uploaded to and stored in a public mail server, the public mail server having a function of sending the e-mails with the permissible addresses to the "normal in box" for the user, and other e-mails will not be sent to the "normal inbox;
   (e) upon clicking the fight mouse button on the "advertising inbox", causing a classification list including different business items to appear for the user to choose, wherein the user can tick a box adjacent to an interested business item to indicate that the advertising e-mail belonging to the selected business item is acceptable, and the advertising e-mails belonging to unselected business items will be blocked, and when the user receives e-mail through the internet, the content of the "classification list" will be automatically uploaded to and stored in the public mail server, the public mail server having a function of sending the advertising e-mail belonging to the selected business item to the "advertising inbox" for the user, and other advertising e-mails belonging to the unselected business items will not be sent to the "advertising inbox";
   (f) asking an advertising e-mail sender to classify the advertising e-mail thereof according to the above-mentioned "classification list", and to attach identifying information to the advertising e-mail to be sent, so as to enable the public mail server to distinguish a classification of the advertising e-mail to determine whether the advertising e-mail's classification is listed in the classification list, and regarding an advertising e-mail without such identifying information as normal e-mail;

(g) if the user fails to make a list of "permissible addresses", causing the public mail server to accept all e-mails that have arrived in a mail box of the user, and to reject all advertising e-mails if the user fails to select an item on the "classification list".

2. The method for receiving and classifying normal e-mail and advertising e-mail as claimed in claim 1, further comprising the step of causing the public mail server to block unsolicited mail by making use of the "permissible addresses" and the classification list" previously defined and uploaded by the user when the user is not online.

3. The method for receiving and classifying normal e-mail and advertising e-mail as claimed in claim 1, wherein steps (d), (e), and (g) are carried out by the mail-receiving-and-sending software, so that the e-mails will be received, classified and blocked by a personal computer of the user.

* * * * *